United States Patent
Radzyner et al.

(10) Patent No.: US 12,161,090 B2
(45) Date of Patent: Dec. 10, 2024

(54) STRUCTURES AND METHODS FOR REMOVAL OF FRAMES FROM BEEHIVES AND A BEE-GATE

(71) Applicant: BEEWISE TECHNOLOGIES LTD., Bet Haemek Industrial Park (IL)

(72) Inventors: Eliyah Radzyner, Sunnyvale, CA (US); Yossi Sorin, Klil D.N. Oshrat (IL); Hallel Ilan Schreier, Klil D.N. Oshrat (IL)

(73) Assignee: Beewise Technologies LTD, Kibbutz Beit-Haemek (IL)

( * ) Notice: Subject to any disclaimer, the term of this patent is extended or adjusted under 35 U.S.C. 154(b) by 11 days.

(21) Appl. No.: 17/762,211

(22) PCT Filed: Sep. 24, 2020

(86) PCT No.: PCT/IL2020/051052
§ 371 (c)(1),
(2) Date: Mar. 21, 2022

(87) PCT Pub. No.: WO2021/059282
PCT Pub. Date: Apr. 1, 2021

(65) Prior Publication Data
US 2022/0369602 A1 Nov. 24, 2022

Related U.S. Application Data

(60) Provisional application No. 62/904,701, filed on Sep. 24, 2019, provisional application No. 62/904,695, (Continued)

(51) Int. Cl.
*A01K 47/06* (2006.01)
*A01K 47/02* (2006.01)

(52) U.S. Cl.
CPC .............. *A01K 47/06* (2013.01); *A01K 47/02* (2013.01)

(58) Field of Classification Search
CPC ........ A01K 47/06; A01K 47/02; A01K 47/00; A01K 55/00; A01K 57/00; A01K 29/00;
(Continued)

(56) References Cited

U.S. PATENT DOCUMENTS

| | | | |
|---|---|---|---|
| 1,768,041 | A | 6/1930 | Fenno |
| 3,456,056 | A | 7/1969 | Reich et al. |

(Continued)

FOREIGN PATENT DOCUMENTS

| | | | |
|---|---|---|---|
| CN | 101720680 A | 6/2010 | |
| CN | 203087245 U | 7/2013 | |

(Continued)

OTHER PUBLICATIONS

Machine translation of KR-20180054182-A to Lee. (Year: 2018).*

(Continued)

*Primary Examiner* — Peter M Poon
*Assistant Examiner* — Carly W. Lynch

(57) ABSTRACT

A beehive for commercial or recreational beekeeping comprises: a plurality of frames and honeycomb frames in a beehive chamber; a mechanism for removing the honeycomb frames from the beehive chamber and inserting the honeycomb frames thereinto; a barrier, planar elements, fluid barrier, or any combination thereof adapted to move the honeycomb frames through while exiting the beehive chamber and to propel bees off the honeycomb frame while making sure the bees remain inside the beehive chamber.

19 Claims, 7 Drawing Sheets

Related U.S. Application Data filed on Sep. 24, 2019, provisional application No. 62/904,699, filed on Sep. 24, 2019, provisional application No. 62/904,703, filed on Sep. 24, 2019.

(58) Field of Classification Search
CPC ..... A01K 29/005; A01M 29/30; A01M 29/34; A01M 29/00
USPC ...... 449/1, 2, 3, 5, 6, 35, 38, 41, 42, 46, 51, 449/52, 53, 61, 64
See application file for complete search history.

(56) References Cited

U.S. PATENT DOCUMENTS

| | | | |
|---|---|---|---|
| 3,771,179 | A | 11/1973 | Ogilby |
| 3,789,443 | A | 2/1974 | Cowen |
| 3,914,812 | A | 10/1975 | Kent |
| 3,999,237 | A | 12/1976 | Solomon |
| 4,288,880 | A * | 9/1981 | Gary .................. A01K 55/00 449/52 |
| 4,520,519 | A | 6/1985 | Kuehl |
| 4,573,228 | A | 3/1986 | Bachalo |
| 5,685,762 | A | 11/1997 | Penrose et al. |
| 6,475,061 | B1 | 11/2002 | Huang |
| 6,524,058 | B1 | 2/2003 | Watters |
| 8,602,837 | B1 | 12/2013 | Allan |
| 10,645,910 | B1 | 5/2020 | Gil Gonzalez |
| 10,757,921 | B1 | 9/2020 | Wood |
| 2002/0086430 | A1 | 7/2002 | Hopmeier |
| 2012/0202403 | A1 | 8/2012 | Sinanis et al. |
| 2014/0212520 | A1 | 7/2014 | Del Vecchio |
| 2014/0370781 | A1 | 12/2014 | Anderson et al. |
| 2015/0049919 | A1 | 2/2015 | Humal |
| 2016/0015007 | A1 | 1/2016 | Sinanis |
| 2017/0064931 | A1 | 3/2017 | Tagliaferri |
| 2017/0360010 | A1 | 12/2017 | Wilson-Rich |
| 2018/0160656 | A1 | 6/2018 | Ben-Shimon et al. |
| 2018/0288977 | A1 | 10/2018 | Hummer et al. |
| 2020/0267945 | A1 | 8/2020 | Symes et al. |
| 2020/0315143 | A1 | 10/2020 | Radzyner |
| 2020/0349397 | A1 | 11/2020 | Criswell et al. |
| 2021/0161107 | A1 | 6/2021 | Gamberoni et al. |
| 2021/0289765 | A1 | 9/2021 | Scofield et al. |
| 2022/0022429 | A1 | 1/2022 | Hummer et al. |
| 2022/0264854 | A1 | 8/2022 | Radzyner |
| 2022/0295760 | A1 | 9/2022 | Radzyner |
| 2024/0251763 | A1 | 8/2024 | Radzyner |

FOREIGN PATENT DOCUMENTS

| | | | |
|---|---|---|---|
| CN | 103583416 A | 2/2014 | |
| CN | 105 519 456 A | 4/2016 | |
| CN | 205511589 U | 8/2016 | |
| CN | 205511592 U | 8/2016 | |
| CN | 106 719 106 A | 5/2017 | |
| CN | 107047378 A | 8/2017 | |
| CN | 108668955 A | 10/2018 | |
| DE | 2156822 B1 * | 5/1973 | ............. A01K 47/00 |
| DE | 20 2006 007269 U1 | 7/2006 | |
| DE | 10 2013 006265 A1 | 10/2014 | |
| IT | UB20159742 A1 | 6/2017 | |
| KR | 200460083 Y1 * | 5/2012 | ............. A01K 57/00 |
| KR | 20120045211 A * | 5/2012 | ............. A01K 59/00 |
| KR | 2012-0060253 A | 6/2012 | |
| KR | 101244803 B1 * | 3/2013 | ............. A01K 57/00 |
| KR | 20140059538 A * | 5/2014 | ............. A01K 59/02 |
| KR | 200475229 Y1 * | 11/2014 | ............. A01K 57/00 |
| KR | 20150102497 A * | 9/2015 | ............. A01K 51/00 |
| KR | 20160101621 A * | 8/2016 | ............. A01K 59/02 |
| KR | 20180054182 A * | 5/2018 | ............. A01K 51/00 |
| KR | 102093334 B1 * | 3/2020 | ............. A01K 57/00 |
| WO | 2012/108857 A1 | 8/2012 | |
| WO | 2019092731 A1 | 5/2019 | |
| WO | WO-2019148235 A1 * | 8/2019 | ............. A01K 47/02 |
| WO | 2021/059282 A1 | 4/2021 | |

OTHER PUBLICATIONS

Machine translation of KR-200475229-Y1 to Kim. (Year: 2014).*
Machine translation of KR-200460083-Y1 to Kim. (Year: 2012).*
Machine translation of KR-20140059538-A to Kim. (Year: 2014).*
Communication and Supplementary Partial European Search Report for Application No. EP 20 86 8356; mailed Feb. 22, 2023 (10 pages).
Communication and European Search Report for Application No. EP 22 19 7442; mailed Feb. 2, 2023 (7 pages).
Communication and European Search Report for Application No. EP 22 19 7464; mailed Feb. 2, 2023 (9 bages).
USPTO office action for U.S. Appl. No. 17/857,071; mailed Oct. 20, 2022 (27 pages).
International Search Report for PCT/IL2018/051223, mailed Feb. 17, 2019 (4 pages).
China Patent Office's office action for application No. 201880073417. 7, mailed Oct. 28, 2020 (7 pages and English translation is 11 pages).
US Patent and Trademark Office's office action for U.S. Appl. No. 16/872,769, mailed Apr. 4, 2022, 64 pages.
International Search Report for PCT/IL2020/051052, mailed on Jan. 6, 2021 (4 pages).
Written Opinion of the International Searching Authority for PCT/IL2020/051052, mailed on Jan. 6, 2021 (5 pages).
Communication Pursuant to Article 94(3) EPC Dated Mar. 14, 2024 From the European Patent Office Re. Application No. 22197464.5. (8 Pages).
Communication Pursuant to Article 94(3) EPC Dated Nov. 6, 2023 From the European Patent Office Re. Application No. 22197464.5. ( 7 Pages).
Communication Pursuant to Article 94(3) EPC Dated Aug. 28, 2023 From the European Patent Office Re. Application No. 22197442.1. (7 Pages).
Decision on Rejection Dated Jan. 8, 2024 From the State Intellectual Property Office of the People's Republic of China Re. Application No. 202080079606.2 and It's Machine translation. (17 Pages).
International Preliminary Report on Patentability Dated May 19, 2020 From the International Bureau of WIPO Re. Application No. PCT/IL2018/051223. (7 Pages).
Interview Summary Dated Nov. 6, 2023 from US Patent and Trademark Office Re. U.S. Appl. No. 17/737,147. (2 pages).
Interview Summary Dated Feb. 12, 2024 from the US Patent and Trademark Officc Rc. U.S. Appl. No. 16/872,769. (2 pages).
Invitation pursuant to Rule 137(4) EPC and Article 94(3) EPC Dated Sep. 20, 2023 From the European Patent Office Re. Application No. 18876119.1. (5 Pages).
Notice of Allowance Dated Jan. 8, 2024 from the US Patent and Trademark Office Re. U.S. Appl. No. 17/835,163. (8 pages).
Notice of Allowance Dated Nov. 8, 2023 from US Patent and Trademark Office Re. U.S. Appl. No. 17/737,147. (10 pages).
Notice of Allowance Dated Oct. 18, 2023 from US Patent and Trademark Office Re. U.S. Appl. No. 17/835,163. (10 pages).
Notice of Allowance Dated Feb. 23, 2024 from the US Patent and Trademark Office Re. U.S. Appl. No. 16/872,769. (20 pages).
Office Action Dated Jul. 9, 2023 From the Israel Patent Office Re. Application No. 274613. (3 Pages).
Official Action Dated May 3, 2023 from US Patent and Trademark Office Re. U.S. Appl. No. 17/737,147. (25 pages).
Official Action Dated Sep. 7, 2023 From the US Patent and Trademark Office Re. U.S. Appl. No. 16/872,769. (40 Pages).
Official Action Dated Feb. 8, 2023 from US Patent and Trademark Office Re. U.S. Appl. No. 17/835,163. (51 pages).
Official Action Dated Oct. 18, 2022 From US Patent and Trademark Office Re. U.S. Appl. No. 16/872,769. (29 Pages).
Official Action Dated Jul. 19, 2023 from US Patent and Trademark Office Re. U.S. Appl. No. 17/737,147. (24 pages).
Official Action Dated Sep. 20, 2023 from US Patent and Trademark Office Re. U.S. Appl. No. 16/872,769. (3 Pages).
Official Action Dated Nov. 21, 2022 from US Patent and Trademark Office Re. U.S. Appl. No. 17/737,147. (21 pages).
Official Action Dated Jul. 28, 2023 from US Patent and Trademark Office Re. U.S. Appl. No. 17/835,163. (15 pages).

(56) References Cited

OTHER PUBLICATIONS

Restriction Official Action Dated Nov. 3, 2021 from the US Patent and Trademark Office Re. U.S. Appl. No. 16/872,769. (9 Pages).
Supplementary European Search Report and the European Search Opinion Dated Oct. 30, 2020 From the European Patent Office Re. Application No. 18876119.1. (9 Pages).
English Summary Dated Aug. 1, 2024 of Notification of Office Action Dated Jul. 12, 2024 From the State Intellectual Property Office of the People's Republic of China Re. Application No. 202080079606.2. (3 Pages).
Notification of Office Action and Search Report Dated Jul. 12, 2024 From the State Intellectual Property Office of the People's Republic of China Re. Application No. 202080079606.2 and Its Machine Translation Into English. (16 Pages).

* cited by examiner

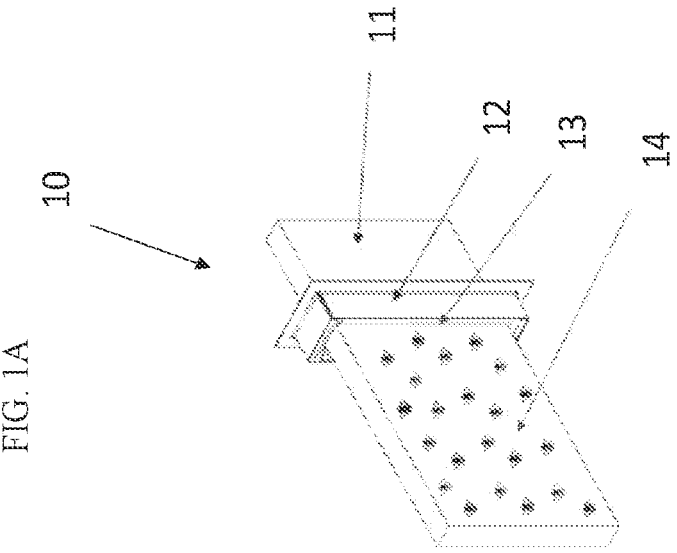
FIG. 1A
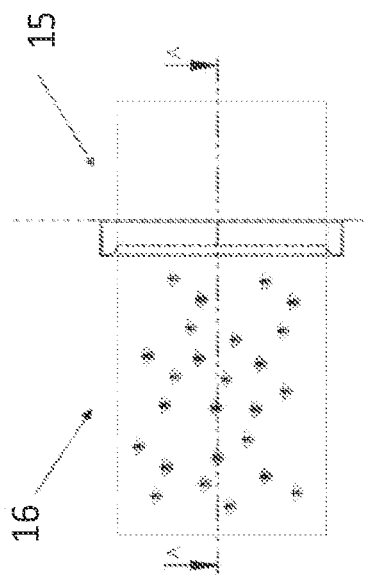
FIG. 1B
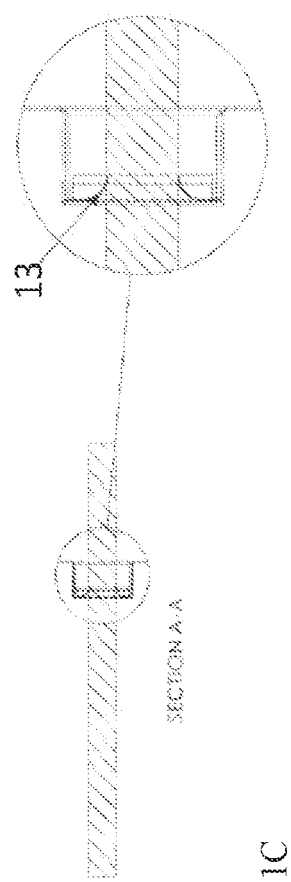
FIG. 1D
FIG. 1C

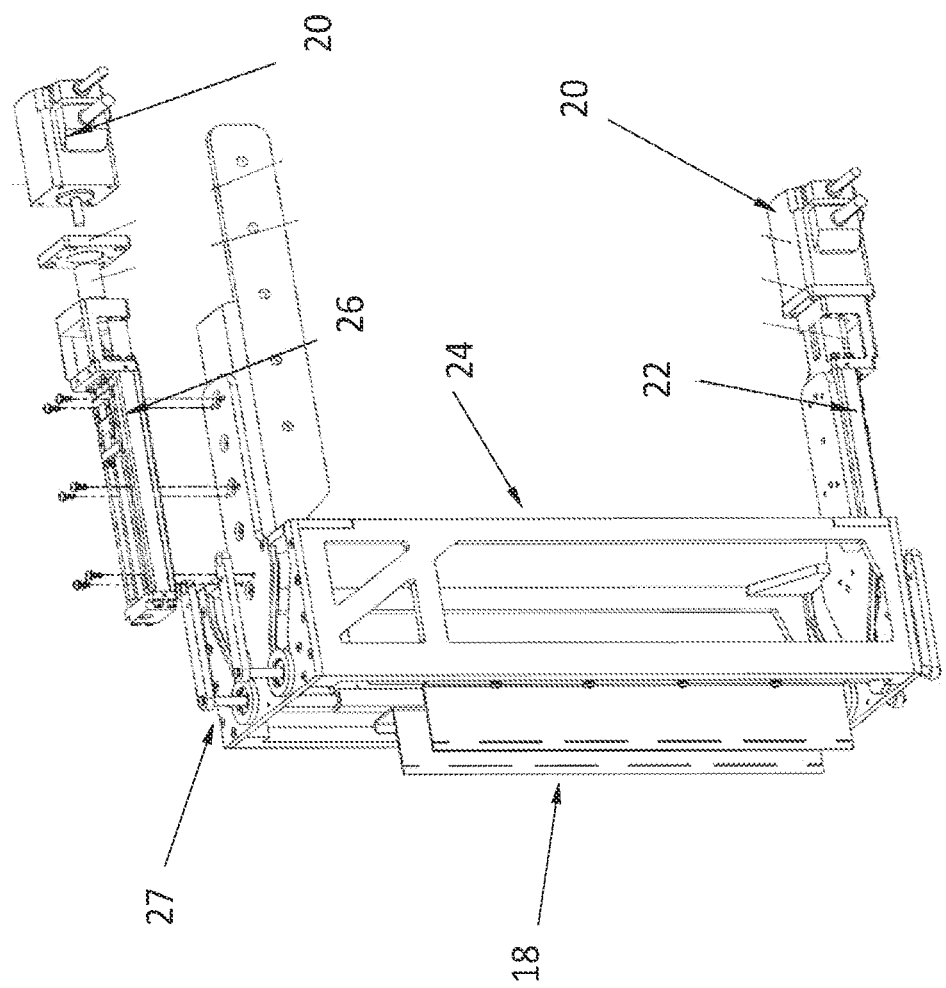

STRUCTURES AND METHODS FOR REMOVAL OF FRAMES FROM BEEHIVES AND A BEE-GATE

RELATED APPLICATION/S

This application claims the benefit of priority of U.S. Provisional Patent Application No. 62/904,699; U.S. Provisional Patent Application No. 62/904,695; U.S. Provisional Patent Application No. 62/904,701; and U.S. Provisional Patent Application No. 62/904,703 all filed on Sep. 24, 2019, the contents of which are incorporated herein by reference in their entirety.

FIELD AND BACKGROUND OF THE INVENTION

The present invention, in some embodiments thereof, relates to a beehive and beehive system, more particularly, but not exclusively, to efficient automatic beehives where inspection of beehive honeycombs is required to maintain a healthy bee population.

Honeybees are of vital importance to both a region's ecology as well as its economy. For about the last thirty years, the rate of increase in pollination-based agriculture has sharply increased, surpassing the average increase in the number of hives. This situation, in addition to the recent colony loss crises, has created a severe shortage in bees for pollination. Inadequate beekeeping methods have partial responsibility for this shortage.

As part of standard beekeeping practices, a honeycomb frames often have to be extracted from the beehive without bees on the honeycomb frames. The extraction from the beehive is used to, among other things; optically monitor cells of the honeycomb frame (by eye or by optical electronic equipment), honey harvesting, pest control, transferring a honeycomb frame to another beehive, and general monitoring of the beehive (such as weight or chemical monitoring).

SUMMARY OF THE INVENTION

According to an aspect of some embodiments of the present invention there is provided a beehive for facilitating honeycomb inspection, comprising: a bee habitat section comprising a beehive chamber; an actuator; and a barrier mounted between the beehive chamber and an area outside of the beehive chamber. The barrier having an opening sized and shaped to tightly encircle a plurality of sequential sides of a honeycomb frame when the honeycomb frame is moved from the beehive chamber, by an actuator along a linear path. When the honeycomb frame is moved from the beehive chamber a gap between an inner surface of the opening and any side of the honeycomb frame is of a sufficient size and structure to admit the honeycomb frame and propel bees off the honeycomb frame.

According to some embodiments of the invention, the barrier further comprises a plurality of flexible protrusions mounted on the inner surface the opening. According to some embodiments of the invention, the barrier further comprises parallel planar elements adapted to insert into a slot of the beehive chamber, on either side of the honeycomb frame. The parallel planar elements define a gap between them, wherein the planar elements are sized and shaped to be tightly adjacent to each of a bee habitat lateral sides of honeycomb frame. According to some embodiments of the invention, the parallel planar elements further comprise flexible protrusions perpendicularly mounted on the parallel planar elements. According to some embodiments of the invention, there is no gap between the plurality of flexible protrusions and the honeycomb frame.

According to some embodiments of the invention, the flexible protrusions comprise one of the following: a brush, a blade, a flap, a comb, a scrubber or any combination thereof. According to some embodiments of the invention, the plurality of flexible protrusions are flaps made from one of the following: a polyvinyl chloride canvas of 420 gr/m; a silicon sheet; a thermoplastic rubber; or a thermoplastic elastomer. According to some embodiments of the invention, the barrier is mounted to the beehive chamber or the barrier is mounted to the actuator.

According to an aspect of some embodiments of the present invention, there is provided a beehive for facilitating honeycomb inspection, comprising: a bee habitat section comprising a beehive chamber; an actuator; a fluid barrier mounted between the beehive chamber and an area outside of the beehive chamber. The fluid barrier is shaped from a conduit and tightly encircles a plurality of sequential sides of a honeycomb frame when the honeycomb frame is extracted by the actuator from the beehive chamber along a linear path. The conduit, in some embodiments may contain a plurality of hoses inside. The conduit further comprising a plurality of fluid release openings fluidly connected to a source of a fluid. When the fluid barrier is activated, the fluid flows onto the honeycomb frame and the fluid propels bees off the honeycomb frame and blocks the bees from leaving the beehive chamber.

According to some embodiments of the invention, the fluid barrier is mounted to the beehive chamber or the actuator. According to some embodiments of the invention, the fluid is one of following: compressed air; water droplets; a liquid suspended in a gas; a liquid; a gas; or a chemical for repelling bees. According to some embodiments of the invention, the fluid is cooled to between 0 to 10 degrees Celsius or heated to between 35-45 degrees Celsius. According to some embodiments of the invention, the barrier is cooled to between 0 to 10 degrees Celsius or heated to between 35-45 degrees Celsius.

According to some embodiments of the invention, when the honeycomb frame is actuated by the actuator to move the honeycomb frame from the beehive chamber, the actuator intermittently pauses movement of the honeycomb frame. According to some embodiments of the invention, the actuator further comprises an attachment mechanism releasably connected to the honeycomb frame and adapted to both, releasably connect to and remove the honeycomb frame from the beehive chamber; as well as, reinsert and release the honeycomb frame once in the beehive chamber.

According to some embodiments of the invention, the beehive further comprises a plurality of honeycomb frames. According to some embodiments of the invention, a motor drives the actuator and the motor is a stepper motor. According to some embodiments of the invention, the actuator is linearly movable inline to at least one honeycomb frame. According to some embodiments of the invention, the actuator further comprises at least one actuator rail oriented inline to at least one honeycomb frame of the beehive chamber and a ball-screw linear actuator configured for removing and inserting the honeycomb frame from the beehive chamber.

According to an aspect of some embodiments of the present invention there is provided method of actuating a honeycomb frame out from a beehive chamber comprising the steps of: providing a beehive; moving, by an actuator, a honeycomb frame along a linear path and through a barrier;

and extracting, by the actuator, the honeycomb frame from the beehive chamber for honeycomb frame inspection. The beehive provided comprising: the bee habitat section the beehive chamber; the actuator. The barrier having: an opening sized and shaped to tightly encircle a plurality of sequential sides of the honeycomb frame when the honeycomb frame is actuated by the actuator from the beehive chamber into the bee inspection section along a linear path.

According to some embodiments of the invention, the method further comprising the steps of: pausing, by the actuator, intermittently during the extraction of the honeycomb frame from the beehive chamber. According to some embodiments of the invention, pausing intermittently, by the actuator, during the extraction of the honeycomb is a pattern of moving the honeycomb 5 millimetre (hereinafter "mm") per second speed and the honeycomb is moved 3 mm followed by a 1 second pause and this pattern is repeated. According to some embodiments of the invention, the method further comprising the step of connecting, by an attachment mechanism of the actuator, the honeycomb frame to the actuator before moving the honeycomb frame, as well as, the step of releasing, by an attachment mechanism of the actuator, the honeycomb frame from the actuator after extraction of the honeycomb frame.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A is an isometric view of a barrier encircling a honeycomb frame according to some embodiments of the present invention;

FIG. 1B is a side view of the barrier encircling the honeycomb frame according to some embodiments of the present invention;

FIG. 1C is a top view of the barrier encircling the honeycomb frame according to some embodiments of the present invention;

FIG. 1D is an enlarged top view of the barrier encircling the honeycomb frame according to some embodiments of the present invention;

FIG. 1E is a perspective view of some embodiments of the barrier according to some embodiments of the present invention;

DESCRIPTION OF SPECIFIC EMBODIMENTS OF THE INVENTION

Figure 1F:
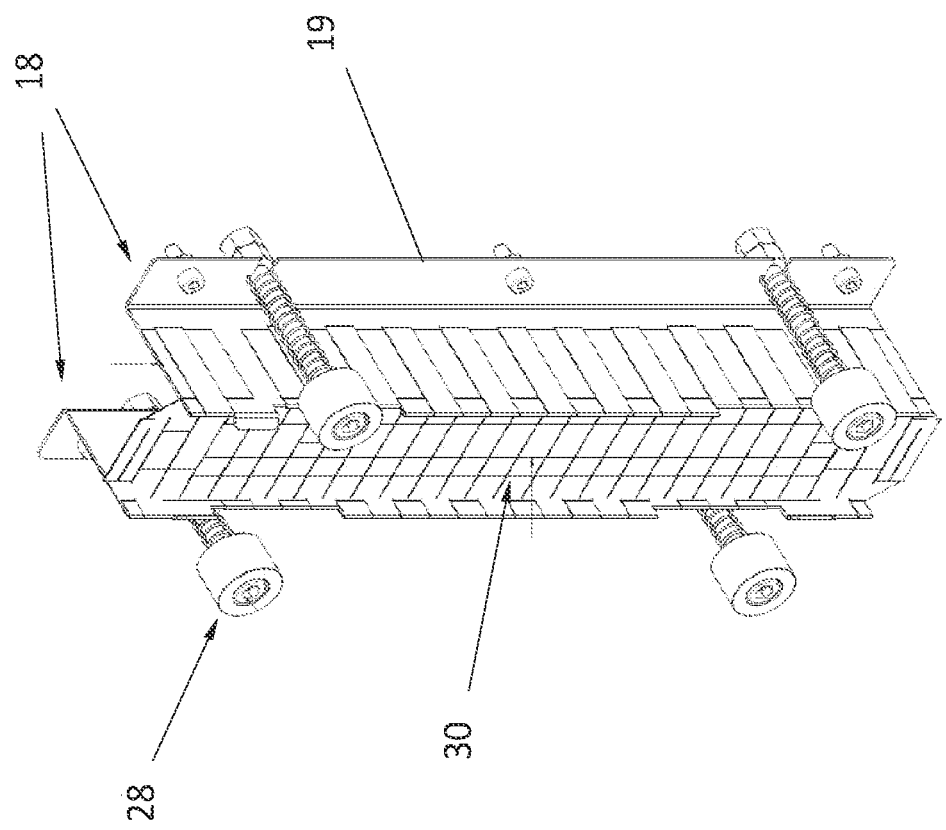
FIG. 1F is a perspective view of some embodiments of the barrier according to some embodiments of the present invention.

The present invention, in some embodiments thereof, relates to a beehive and beehive system, more particularly, but not exclusively, to efficient automatic beehives where inspection of beehive honeycombs is required to maintain a healthy bee population. Thus, there is a long-felt need for providing a technical solution effectively separating bees from the honeycomb frames, as well as blocking bees from leaving the beehive, when the honeycomb frames are extracted from the beehive.

In some embodiments of the beehive system, there is a side-sliding configuration of beehive chambers and frames. As used herein the term frame is a structural element in a beehive that holds a honeycomb, brood comb or is spacer for the beehive. These frames include, but are not limited to a honeycomb frame, feeder frame, a queen excluder frame and a partition frame. In some embodiments of the beehive system, an actuator moves a honeycomb frame through a barrier and the barrier encourages the movement of bees off the honeycomb frame while the bees remain in a beehive chamber. In some embodiments of the beehive system, the actuator moves the honeycomb frame through a fluid barrier and a fluid flow encourages the movement of the bees thereon off the honeycomb frame while stopping the bees from leaving the beehive chamber. As used herein, "fluid" means a liquid, a gas or any combination thereof.

In some embodiments of the beehive system, the side-sliding configuration is a box-frames system that includes all the different frames in an unified automation-friendly system. In some embodiments, beehives and the different parts of the beehive use materials such as, but not limited to, silicones, soft plastics, polymeric foams and any combination thereof.

In some embodiments of the beehive system, an XYZ Cartesian robot is at the base of the beehive system and used to manipulate the different honeycomb frames and/or frames in the beehive chamber. In some embodiments of the beehive system, a combination of electric linear modules (belt and ball-screw driven) and pneumatic linear cylinders, grippers, grabbers and spears are used to manipulate the different honeycomb frames.

In some embodiments of the beehive system, data relating to the honeycomb frames are collected using a variety of sensors. In some embodiments of the beehive system, includes a non-transitory memory having stored thereon a code for execution by at least one hardware processor of a computing device, and when the code is executed, selected tasks according to embodiments of the disclosed technology are implemented. For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the disclosed technology, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the FIGS. 1A-D illustrates a structure of some embodiments of the beehive system. Structure 10 has a honeycomb frame 11 having bees 14 thereupon and a barrier 12. As used herein, "barrier" means an obstacle that prevents movement or access between spaces, and particularly of bees between spaces. In some embodiments, the structure 10 is in a beehive and barrier 12 is between a beehive chamber (see FIG. 3, 300) and an outside area of the beehive chamber. The area outside the beehive chamber may be a bee inspection section. In some embodiments, there are a plurality of honeycomb frames 11 in a beehive chamber, and at least one actuator (see FIGS. 4 and 5, 140) operable to align with a designated honeycomb and actuate or move the designated honeycomb through the barrier along a linear path. In some embodiments, the at least one actuator or an actuator are a mobile actuator. As used herein a "mobile actuator" means an actuator able to move or be moved freely or easily.

In some embodiments, barrier 12 is mounted on a mobile actuator and the barrier moves with the actuator. In some embodiments, the barrier is mounted as part of a cartesian robot system and moves with the cartesian robot. In some embodiments, barrier 12 has an opening sized and shaped to tightly encircle a plurality of sequential sides of honeycomb frame 11 when the honeycomb frame moves from the beehive chamber. As used herein, an "actuator" means a component of a machine or system responsible for moving and controlling an element of a system.

In some embodiments, a gap between an inner surface of the opening of barrier 12 and any side of the honeycomb frame is of a sufficient size and structure to receive the honeycomb frame and propel bees off the honeycomb frame. For example, the gap between an inner surface of the barrier and any side of the honeycomb frame may be in the range between 0.5 to 10 mm. As an example, FIG. 1B illustrates a portion 15 of honeycomb frame 11 outside of the beehive chamber that has no bees and an inside portion 16 of honeycomb frame 11 having bees 14. In some embodiments, the barrier is of sufficient size and structure to admit both the bees and the honeycomb frame for occasions that require both the bees 14 and the honeycomb frame 11 to leave the beehive chamber.

In some embodiments, barrier 12 further comprises a plurality of protrusions 13 for mechanically removing bees 14 from the honeycomb frame 11. In some embodiments, the protrusions 13 are mounted on an inner surface of the opening of barrier 12, such that protrusions 13 are perpendicular to any side of the honeycomb frame as it moves through the barrier. In some embodiments, the plurality of protrusions are flexible protrusions and there is no gap between the flexible protrusions. The flexible protrusions are adapted to move and flex to receive the honeycomb frame while still maintaining a tight flexible connection with cells of the honeycomb frame. The flexible protrusions 13 type may include, but is not limited to blades, combs, scrubbers, flaps, brushes or any combination thereof. In some embodiments, the protrusions are made from a soft and durable material. Alternatively, the protrusions may be, but are not limited to, the following materials, polyvinyl chloride (PVC), silicon, nylon, thermoplastic rubber (TPR), thermoplastic elastomer (TPE), thin layered PVC, thin silicon sheet or any combination thereof. Alternatively, the material and thickness of the protrusions 13 are stiff enough to propel bees off the honeycomb frame while soft enough to not harm the wax surface of the honeycomb frame as it brushes against the protrusions.

Referring to FIG. 1E, in some embodiments, a barrier body 24 mounted on an actuator system has two parallel planar elements 18 defining a gap between the parallel planar elements that is sufficiently sized and shaped to allow an extraction of a honeycomb frame between the two parallel planar elements. The gap between the two planar elements may be in the range between 15 to 31 mm. In some embodiments, the actuator system further comprises planar actuators 20 and linear axis 22 and 26 to actuate the barrier body. In some embodiments, the planar actuators inserts the planar elements into the beehive chamber. The parallel planar elements are sized and shaped to be tightly adjacent to each of a bee habitat lateral sides of honeycomb frame 11. The parallel planar elements once inserted are adapted to receive the honeycomb frame and propel bees off the honeycomb frame and stop the bees from leaving the beehive chamber. A "bee habitat" as used herein means a natural home or environment for bees to live.

The beehive chambers also comprise frame openings for the honeycomb frames to exit and enter the beehive chambers. Removal of a honeycomb frame using the barrier body of FIG. 1E may additionally rely on a surround of the frame openings in the beehive chamber to deter bees 14 from leaving the beehive chamber.

The planar elements 18, in some embodiments, mount into slots 27 of the actuator system, and the slots vary in distance to each other. The varying slots 27 arrangement allows for control and adjustment of the gap between the planar elements.

FIG. 1F illustrates parallel planar elements 18 with flanges 19 for mounting onto an actuator system or a beehive chamber, in some embodiments of the current disclosure. The parallel planar elements further comprise flexible protrusions 30 that are, in some embodiments, flexible flaps. The planar elements, in some embodiments, are inserted into the beehive chamber and flexible protrusions 30 are perpendicular to each of a bee habitat lateral sides of honeycomb frame 11. The flexible protrusions 30 are flexible enough to receive the honeycomb frame and propel bees off the honeycomb frame. As the actuator extracts a honeycomb frame from the beehive chamber through flexible protrusions 30, the flexible protrusions bend and seal to surfaces of the bee habitat lateral sides of the honeycomb frame.

In some embodiments, the flexible protrusions 30 are flaps made of PVC canvas sheet, having a weight in the range between 415 to 425 grams per square meter. In some embodiments, the flexible protrusion 30 are flaps made of silicon sheets, TPR or any combination thereof. In some embodiments, the flaps 30 are made of TPE with a Schur in the range between 40 to 80 and/or with a width in the range between 0.6 to 1.2 mm.

In some embodiments, the flexible protrusions 30 are flaps that are cut perpendicular to a long edge of the flap. The cuts define a plurality of flap segments between cuts of the flexible protrusion, and each flap segment has the ability to bend separately. The flexibility of the flexible protrusions is important as the surface of the honeycomb frame or any frame is often uneven with grooves and bumps. Thus, the flexible protrusions bend and closely follow the lateral sides of the honeycomb frame and maintain a good seal while the frame moves through the barrier.

In some embodiments, each of the flap segments of the flexible protrusion are wider than a bee cell to ensure that each flap segment does not enter empty bee cells. In some embodiments, stoppers with springs, 28 are positioned against neighbouring honeycomb frames as the actuator extracts the desired honeycomb frame from the beehive chamber. These stoppers are operable to stop neighboring honeycomb frames inside the beehive chamber, from extracting with the desired honeycomb frame.

In some embodiments, barrier 12 is heated or cooled to propel the bees off the honeycomb. Temperatures in the range between 0 to 10 degrees Celsius are cold for bees 14 and temperatures in the range between 35 to 45 degrees Celsius are hot for the bees. Alternatively, parallel planar elements 18 may be heated or cooled for this same purpose. A plurality of systems for heating and cooling an element, such as the barrier, may be used without limiting the scope of the disclosed subject matter.

Figure 2A:
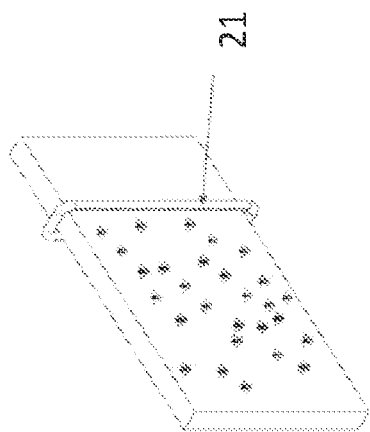
FIG. 2A is an isometric view of a fluid barrier encircling a honeycomb frame according to some embodiments of the present invention.
Figure 2B:
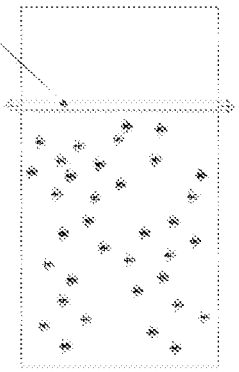
FIG. 2B is a side view of the fluid barrier encircling the honeycomb frame according to some embodiments of the present invention.
Figure 2C:
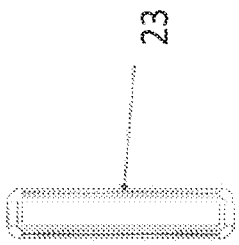
FIG. 2C is a view of the fluid barrier and fluid release openings on conduit of the fluid barrier according to some embodiments of the present invention.

FIGS. 2A-C illustrates a structure of some embodiments of the beehive system. In this structure, fluid barrier 21 is between the beehive chamber and the area outside of the beehive chamber. As used herein, the term "fluid" refers to a liquid, a gas, or any combination thereof. In some embodiments, fluid barrier 21 is a conduit 22 and is fluidly connected to a source of flowable fluid and has fluid release openings 23 positioned to flow fluid onto the honeycomb frame. As used herein, "fluidly connected," refers to fluid capable of flowing back and forth between two chambers. When a flow of fluid is activated, the fluid flows onto a honeycomb frame to propel bees 14 off the honeycomb frame and deter bees from leaving the beehive chamber. The flow of fluid may be activated by, among other things, an input or a processor configured to execute code.

The fluid barrier and/or conduit, in some embodiments, surrounds a plurality of sequential sides of a honeycomb frame encircling an opening sized and shaped to tightly encircle the plurality of sequential sides of a honeycomb frame 11 when the honeycomb frame is moved from the beehive chamber in a linear path.

In some embodiments, the fluid that flows onto the honeycomb frame is a powerful flow operable to propel bees off the honeycomb frame and deter the bees from exiting the beehive chamber. In some embodiments, the fluid that flows onto the honeycomb frame is a liquid suspended in gas, such as mist and/or fog. In some embodiments, the fluid that flows onto the honeycomb frame is a gas. This gas may be any chemical that repels bees. In some embodiments, the fluid is water drops, and the water repels bees 14 and the bees move away from the water source. In some embodiments, the fluid is liquid. The liquid may be a chemical that repels bees. In some embodiments, the fluid (liquid, gas, or any combination) is heated or cooled. Temperatures in the range between 0 to 10 degrees Celsius are cold for bees 14 and temperatures in the range between 35 to 45 degrees are hot for the bees. These temperatures repel bees. Optionally, the fluid that is heated or cooled may be air. In some embodiments, the chemicals used to repel the bees are, but are not limited to, butyric acid, benzaldehyde, oil of bitter almonds or in any combination thereof, and they may be a gas, a liquid or droplets. In some embodiments, pneumatic properties flow the fluid onto the honeycomb frame.

In some embodiments, an actuator further comprises an attachment mechanism operable to releasably connect the actuator to the honeycomb frame, thus enabling the actuator to move the honeycomb frame. The attachment mechanism may be cylinders, grippers, grabbers, spears or any combination thereof. As an example, the attachment mechanism may be a spear that is pushed, by the actuator, into the frame to connect and move the honeycomb frame. To disconnect the spear from the honeycomb frame, the actuator pulls the spear out of the honeycomb frame. Any attachment mechanism of an actuator, for releasably connecting an actuator to the honeycomb frame, may be used without limiting the scope of the disclosed subject matter.

In some embodiments of the current disclosure, there is a method for moving the honeycomb frame through any element for propelling bees off the honeycomb frame, such that the bees remain in the beehive chamber. An actuator, controlled by human inputs or a processor configured to execute code, moves the honeycomb frame through an element. This element may be a barrier, planar elements, a fluid barrier, or any combination thereof. In some embodiments, the actuator intermittently pauses movement of the honeycomb frame through the element. As used herein, "pause," "pausing" or "pauses" means a temporary interruption of an operation or stopping of a movement.

This stop and start method (also known as intermittent pausing) is advantageous because bees 14 naturally may exhibit herd behavior. As used herein, "herd behavior" means a group moving collectively without centralized direction. Therefore, when the bees are touched multiple times by either an element or fluid (gas, liquid or any combination thereof) the bees are more likely to exhibit herd behavior and move away from the honeycomb frame. In some embodiments, speed, distance or time moved before stops, and the duration of stops are all used in combinations and patterns to encourage the bees to move off the honeycomb frame. One example of this method would be to move the honeycomb frame in the direction of exiting the beehive chamber about 5 mm and then stop for about 1 second. After that continue moving the honeycomb frame by about 5 mm and then stop for about 2 second. Follow that with the continued movement of the honeycomb frame about 7 mm and stop for about 0.5 seconds. Yet another example of this method is to pause intermittently during the extraction of the honeycomb as follows: moving the honeycomb 5 mm per second speed pausing for about 2 seconds and then moving the honeycomb 3 mm followed by a 1 second pause. This pattern is repeated.

Figure 3:
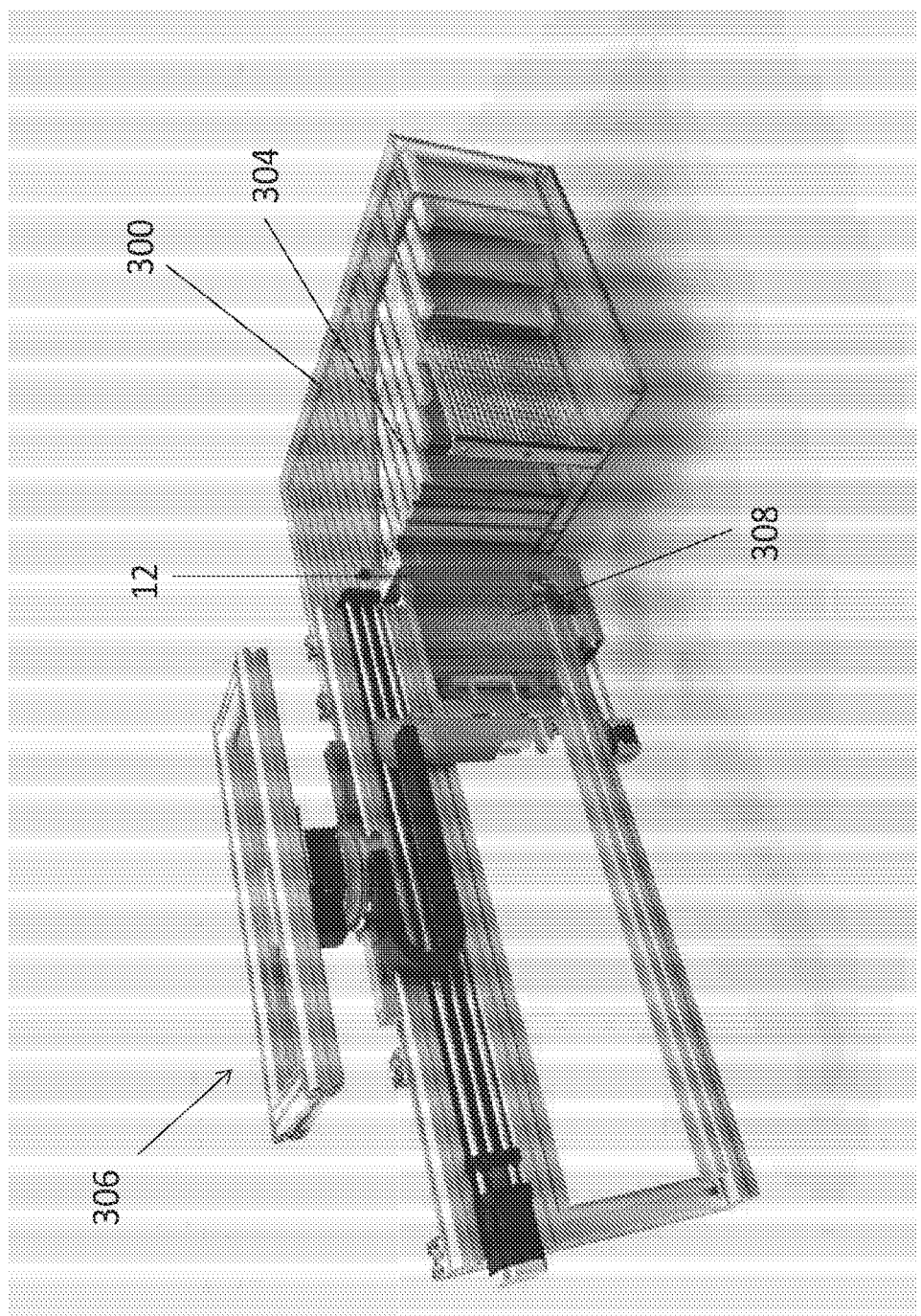
FIG. 3 is a cutaway perspective view of an automatic beehive in according to some embodiments of the present invention.

Reference is now made to FIG. 3 is a perspective cutaway view of a structure in some embodiments of the disclosed subject matter. A beehive chamber 300 comprises a plurality of honeycomb frames 304 that are vertically placed one near the other in a row in the beehive chamber. In some embodiments, the actuator extracts a designated honeycomb frame 308 from the beehive chamber 300 through a barrier 12. In some embodiments, the honeycomb frame may be extracted and retracted back to its position using an actuator 306. In some embodiments, the actuator is inline with the designated honeycomb frame such as 308 and linearly actuates the honeycomb frame from the beehive chamber. In some embodiments, the actuator is at least one mobile actuator operable to align with a designated honeycomb and actuate the honeycomb 304 or 308 through the barrier 12 along a linear path.

In some embodiments, the actuator further comprises one or more motors and pushing rods. In some embodiments, the actuator further comprises a ball-screw linear actuator configured for removing and inserting the honeycomb frame from and in the beehive chamber. In some embodiments of the actuator, a motor drives the actuator and that motor may be a stepper motor. Other actuators and actuating systems may be used without limiting the scope of the disclosed subject matter. In some embodiments, a processor, configured to execute code, electrically connects to and controls the actuator. In some embodiments, the processor may be placed anywhere, including external to the beehive. In some embodiments, there is a wireless connection between the processor and the actuator.

Figure 4:
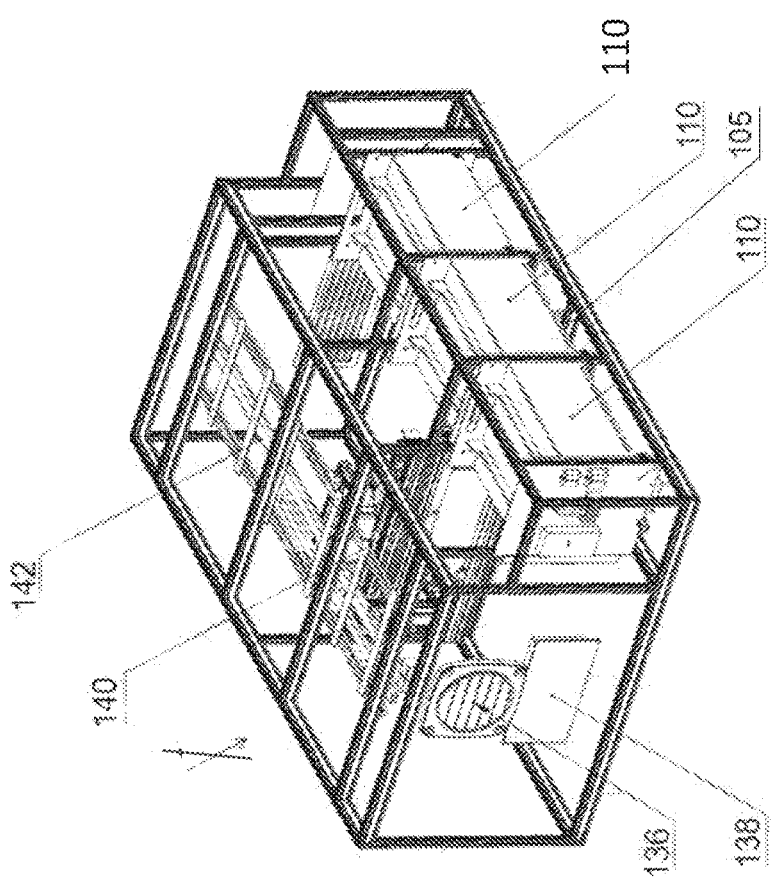
FIG. 4 is an isometric view of a unit of several beehive chambers with a frame actuator according to some embodiments of the present invention.

Reference is now made to FIG. 4, presenting an internal isometric view of a system in some embodiments of the current disclosure. In some embodiments, there are a plurality of beehive chambers 110. In some embodiments, actuator 140 is displaceable along a main axis 142 which is parallel to a front (not shown) of beehive chambers 110. Optionally, a vent 136 is used for an air flow into/out of this beehive system. Camera 138, optionally captures images of honeycomb frames and transmits obtained images to a processor configured to analyze them. In some embodiments, a camera or sensor is mounted on an actuator system for extracting honeycomb frames. In some embodiments, opening 105 facilitates bees exiting or entering the beehives.

Figure 5:
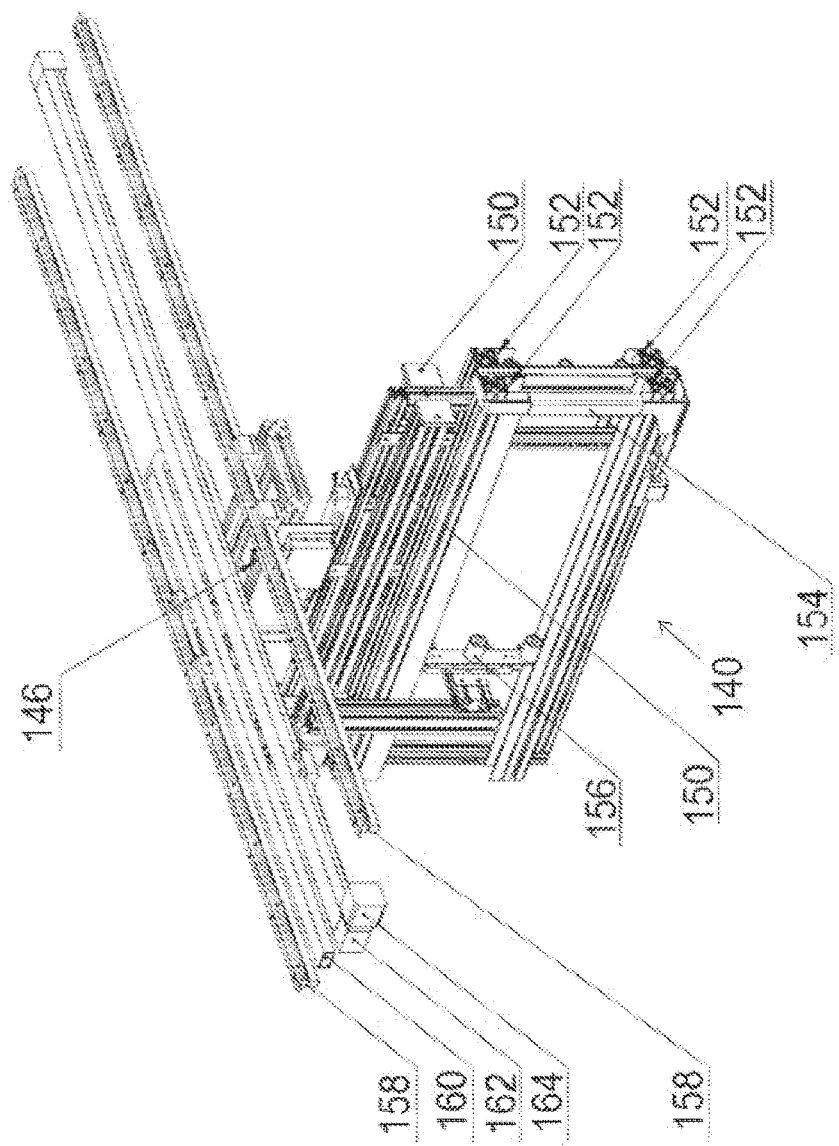
FIG. 5 is an isometric enlarged view of an actuator according to some embodiments of the present invention.

FIG. 5 is an enlarged isometric view of some embodiments of the actuator. A honeycomb frame (not shown) is placed into actuator 140 displaceable along main axis rails 158 by stepper motor 164. In some embodiments, the stepper motor engages a drag chain and linear drive belt 160 and 162, respectively. In some embodiments, actuator 140 connects to rails 158 via rotating table 146. The honeycomb frame is movable along loader rails 152 through a barrier 154 and securable by grabber 156. Linear displacement of the honeycomb frame along rails 152 is carried out by ball screw linear actuators 150.

It is expected that during the life of a patent maturing from this application many relevant elements adapted to move a frame through and adapted to propel bees off the frame and block bees from leaving a beehive will be developed and the scope of the these terms are intended to include all such new technologies a priori.

As used herein the term "about" refers to ±30%

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. The ranges are also meant to include the first and second indicated numbers and all the fractional and integral numerals therebetween. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A beehive comprising:
   a bee habitat comprising a beehive chamber;
   an actuator; and
   a barrier mounted on the actuator and having two parallel planar elements sized and shaped to be tightly adjacent to each of lateral sides with bee cells of a honeycomb frame when the honeycomb frame is actuated by the actuator from the beehive chamber along a linear path, wherein the parallel planar elements mount into slots provided in the actuator,
   wherein when the honeycomb frame is actuated by the actuator from the beehive chamber said two parallel planar elements admit the honeycomb frame and propel bees off the honeycomb frame.
2. The beehive of claim 1, wherein the barrier includes a plurality of release openings, and wherein when a substance is activated to flow from the release openings, the substance pushes bees off the honeycomb frame and blocks bees from leaving the beehive chamber.

3. The beehive of claim 2, wherein the substance is cooled or heated.

4. The beehive of claim 1, wherein when the honeycomb frame is actuated by the actuator from the beehive chamber, the actuator intermittently pauses movement of the honeycomb frame.

5. The beehive of claim 1, wherein the actuator comprises an attachment mechanism that is adapted to both:
releasably connect to the honeycomb frame in order to pull the honeycomb frame from the beehive chamber; and
release the honeycomb frame after insertion of the frame into the beehive chamber.

6. The beehive of claim 1, wherein the barrier further comprises a plurality of flexible protrusions.

7. The beehive of claim 6, wherein the plurality of flexible protrusions maintain a tight flexible connection with cells of the honeycomb frame.

8. The beehive of claim 6, wherein the flexible protrusions are flaps that are cut perpendicular to a long edge thereof, wherein the cuts define a plurality of flap segments each separately bendable to closely follow said lateral sides of the honeycomb frame.

9. The beehive of claim 8, wherein the plurality of flap segments are each wider than a bee cell to ensure that each flap segment does not enter empty bee cells.

10. The beehive of claim 1, wherein the two parallel planar elements define a gap between them, and wherein the two parallel planar elements are movable such that said gap is variable.

11. The beehive of claim 1, wherein the barrier is cooled.

12. The beehive of claim 1, further comprising stoppers with springs positioned against neighboring honeycomb frames as the actuator extracts the honeycomb frame from the beehive chamber and operable to stop the neighboring honeycomb frames inside the beehive chamber from extracting with the honeycomb frame.

13. The beehive of claim 1, wherein the parallel planar elements having flanges for mounting the barrier onto the actuator.

14. The beehive of claim 1, wherein the actuator actuates the honeycomb frame along the linear path in a side-sliding configuration longitudinally of said lateral sides.

15. A method of actuating a honeycomb frame out from a beehive chamber comprising the steps of:
providing a beehive comprising:
a bee habitat section comprising the beehive chamber;
an actuator; and
a barrier mounted on the actuator, the barrier including:
two parallel planar elements sized and shaped to be tightly adjacent to each of lateral sides with bee cells of a honeycomb frame when the honeycomb frame is actuated by the actuator from the beehive chamber along a linear path, wherein the parallel planar elements mount into slots provided in the actuator;
moving, by the actuator, the honeycomb frame along the linear path and through the barrier; and
extracting, by the actuator, the honeycomb frame from the beehive chamber;
causing a substance to flow from a plurality of release openings in the barrier to push bees off the honeycomb frame.

16. The method of claim 15, further comprising the step of:
pausing, by the actuator, intermittently during the extraction of the honeycomb frame from the beehive chamber.

17. The method of claim 15, comprising cooling or heating at least one of the substance and barrier.

18. The method of claim 15, further comprising:
releasably connecting an attachment mechanism of the actuator to the honeycomb frame in order to pull the honeycomb frame from the beehive chamber; and
releasing the attachment mechanism of the actuator from the honeycomb frame after insertion of the frame into the beehive chamber.

19. A system including:
a plurality of honeycomb frames in a chamber; and
an actuator designed to extract one of the honeycomb frames from said chamber; and
a plurality of release openings in a barrier mounted on the actuator that are positioned to flow fluid onto the honeycomb frame and located on two parallel planar elements of the barrier sized and shaped to be tightly adjacent to each of lateral sides with bee cells of the honeycomb frame when the honeycomb frame is actuated by the actuator from the chamber along a linear path, wherein the parallel planar elements mount into slots provided in the actuator and the plurality of release openings deliver a flow of a substance which pushes bees off the honeycomb frame when the honeycomb frame is extracted.

* * * * *